United States Patent [19]

Young

[11] 4,057,310

[45] Nov. 8, 1977

[54] ELECTRICAL COUPLING APPARATUS

[76] Inventor: Clyde J. Young, Rte. 2, Box 165A, Laurel Hill, N.C. 28351

[21] Appl. No.: 723,145

[22] Filed: Sept. 14, 1976

[51] Int. Cl.² .............................................. B60D 1/08
[52] U.S. Cl. .................................... 339/10; 339/14 R; 339/28
[58] Field of Search ..................... 339/10, 14 R, 28; 280/422; 307/9, 10 R, 10 LS

[56] References Cited

U.S. PATENT DOCUMENTS

| 1,672,067 | 6/1928 | Labre | 339/14 R |
| 2,892,175 | 6/1959 | Frey | 339/256 SP |
| 2,989,645 | 6/1961 | Frieden | 307/10 R |
| 3,467,942 | 9/1969 | Dell et al. | 339/49 R |
| 3,697,924 | 10/1972 | Oliver | 339/14 R |

Primary Examiner—Roy Lake
Assistant Examiner—Neil Abrams
Attorney, Agent, or Firm—Bell, Seltzer, Park & Gibson

[57] ABSTRACT

An electrical coupling apparatus adapted to properly match and interconnect the electrical circuit of each of a number of different trailers or the like with that of each of a number of different towing vehicles. The apparatus comprises a polarized coupler interconnecting first and second multi-conductor vehicle electrical systems, and a universal coupler interconnecting one of the first and second systems with the polarized coupler. The universal coupler includes a support mounting a contact for each conductor of an intermediate circuit, and a terminal carried at the end of each conductor of the one system. The terminals are individually connectable to the contacts in any desired arrangement to thereby permit a proper matching of the conductors of the two vehicle circuits.

5 Claims, 4 Drawing Figures

ELECTRICAL COUPLING APPARATUS

The present invention relates to an electrical coupling apparatus for interconnecting the electrical circuits of releasably interconnected vehicles, such as an automobile and trailer. In addition, the apparatus has provision for assuring a desired connection between the several conductors in the two vehicle circuits.

Trailers of the type adapted to be towed by an automobile or other towing vehicle typically have an electrical circuit which includes at least three separate conductors for operating the two tail lights and a license plate light. Where brake lights and turn signals are included, four conductors are required, and in some cases additional conductors are included for operating other auxiliary electrical systems, such as back-up lights. As will be readily apparent, it is necessary that the several conductors of the trailer be properly matched and connected to the corresponding conductors of the electrical circuit of the towing vehicle to obtain proper operation of the running lights, brake lights, turn signals, and other electrical systems on the trailer. For this purpose, polarized electrical connectors are conventionally used to match and interconnect the electrical circuit of the trailer with that of the towing vehicle.

While such polarized connectors are adequate to interconnect one particular towing vehicle with one particular trailer, problems are often encountered where a common towing vehicle is employed with a number of different trailers, or where a common trailer is connected to a number of different towing vehicles. In particular, trailers of different manufacture and design are not always similarly wired, and also, different towing vehicles are not always similarly wired. As a result, the interconnection of the electrical systems of a trailer with that of the towing vehicle through their polarized connectors will often result in an improper interconnection and the improper operation of the lights and electrical systems on the trailer.

It is accordingly an object of the present invention to provide an electrical coupling apparatus which permits the electrical circuits of a towing vehicle and trailer to be readily matched and interconnected.

It is a more particular object of the present invention to provide an electrical coupling apparatus wherein any one of a number of differently wired trailers may be readily and properly interconnected with the electrical system of any one of a number of towing vehicles.

These and other objects and advantages of the present invention are achieved in the embodiment illustrated herein by the provision of an electrical coupling apparatus which comprises universal coupling means for selectively and releasably interconnecting the conductors of one multi-conductor electrical system with the conductors of another multi-conductor electrical conductor system. The universal coupling means comprises an electrically insulating support, and a plurality of electrical contacts carried by the support, with each contact being electrically connected to a separate conductor of one multi-conductor system. A terminal is carried at the end of each conductor of the other multi-conductor system, with each of the terminals being connected to a separate conductor of the other multi-wire system and being selectively and releasably interconnectable with any one of the contacts on the support. By this arrangement, the terminals may be selectively interconnected to the contacts in any desired arrangement to thereby permit a proper interconnection of the two multi-conductor electrical circuits of the towing and towed vehicles. In a preferred embodiment, the universal coupling means is inserted between one vehicle circuit and a polarized coupling means which facilitates the ready separation of the electrical circuits of the two vehicles and the subsequent recoupling thereof with a fixed, predetermined arrangement of the interconnected conductors. Also, one of the conductors which is electrically connected to a contact on the support comprises a releasable clamping member for attaching the support to the frame of one of the vehicles and thereby serving as a ground.

Some of the objects of the invention having been stated, other objects will appear as the description proceeds, when taken in connection with the accompanying drawings, in which FIG. 1 is a perspective view of an automobile and towed trailer and boat, and illustrating the environment in which the present invention is employed;

Figure 1:
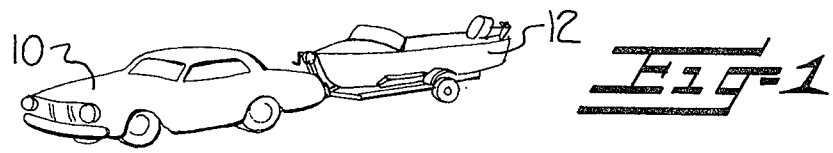
Figure 2:
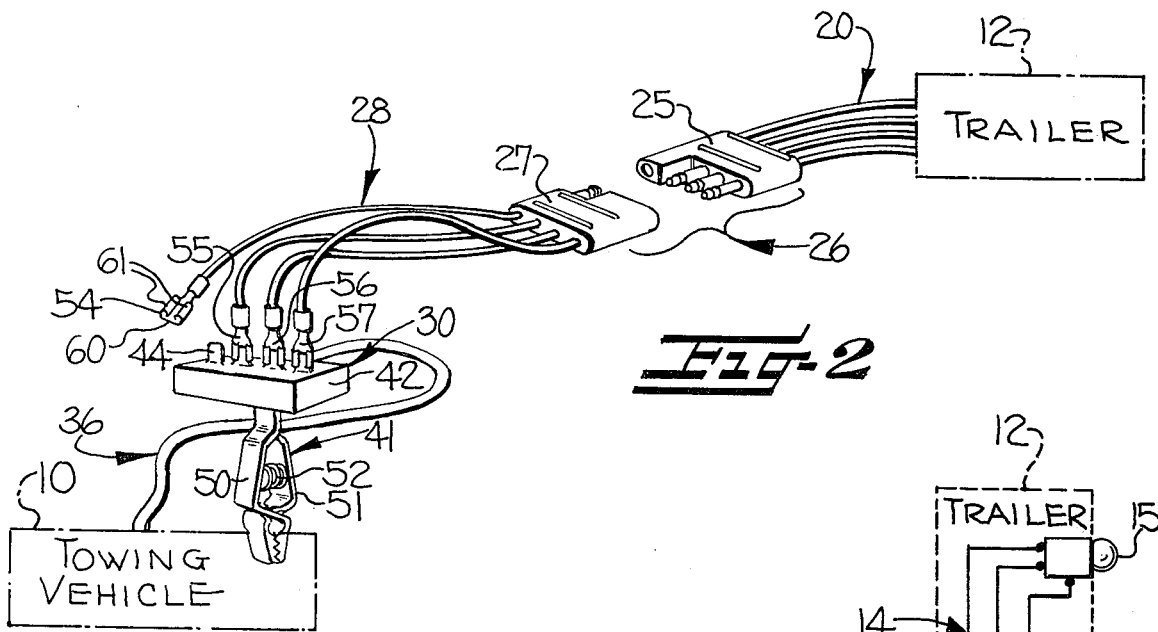
FIG. 2 is a partly schematic perspective view illustrating a coupling apparatus which embodies the present invention.

Referring more specifically to the drawings, FIG. 1 shows a typical environment in which the present invention may be utilized, namely, in association with an automobile 10 and a releasably interconnected boat trailer 12. As will become apparent, the invention is also useful in other applications, such as the electrical interconnection between a towing vehicle and mobile home, or between a boat and dock.

As is well known, boat trailers and other towed vehicles of the type adapted to run on the highway have a multi-conductor electrical circuit for operating a number of lights, and possibly other electrical equipment. In the specific example illustrated in FIG. 3, the trailer circuit 14 includes a pair of tail lights 15, 16 and a light 18 for illuminating the license plate of the trailer. A four-wire electrical conductor system 20 is necessary to properly operate these lights, and the system 20 includes a wire 21 for operating all three lights in the running condition, a wire 22 for operating the turn signal filament of one tail light 15, a wire 23 for operating the turn signal filament of the other tail light 16, and a ground wire 24. The ground wire may be connected directly to the trailer frame. These four wires are connected to one terminal 25 of the polarized coupler 26, and the mating terminal 27 is connected to an intermediate four-wire electrical conductor system 28. While a four conductor electrical system is illustrated herein, it will be appreciated that the present invention may also be utilized in systems having a different number of conductors.

In accordance with the present invention, universal coupling means 30 is provided for selectively interconnecting the wires 31, 32, 33, 34 of the intermediate conductor system 28 with one vehicle multi-conductor electrical system 36 which comprises three wires 38, 39, 40 and a grounding clamp 41. More particularly, the universal coupling means 30 comprises a rectangular solid block or support 42 which is fabricated from an electrically insulating material, such as plastic. Four spaced apart, like, electrical contacts 44, 45, 46, 47 are fixedly carried on one side of the support, with three of the contacts 44, 45, 47 being electrically connected to separate wires 38, 39, 40 of the third system and the fourth contact 46 being electrically connected to the grounding clamp 41. The contacts each comprise a metallic flat prong, and the grounding clamp also comprises a metallic electrically conductive material. Further, the clamp comprises a pair of prongs 50, 51 which are biased by the spring 52 into a closed position. As will be apparent, the prongs may be readily opened by manually squeezing the same together. Preferably, the clamp is directly connected to the support 42 and extends outwardly therefrom on the side opposite the contacts for the purpose of readily mounting the support on the frame of the one vehicle carrying the respective circuit and grounding the circuit as hereinafter further described.

The universal coupling means 30 further comprises a total of four terminals 54, 55, 56, 57 carried at the ends of the wires 31, 32, 33, 34 of the intermediate circuit 28. More particularly, each terminal is electrically connected to a separate wire of the intermediate circuit 28, and each terminal comprises a metallic, generally flat lug 60. Means are also provided for releasably interconnecting the terminals and contacts, whereby the terminals may be selectively interconnected to the contacts in any desired arrangement. In the illustrated embodiment, this interconnecting means comprises a curled side edge 61 extending along each side of each lug 60 and such that each contact is adapted to be slidably received within each terminal, with the curled side edges 61 resiliently engaging the surface of the contact to effect a secure electrical interconnection.

Figure 3:
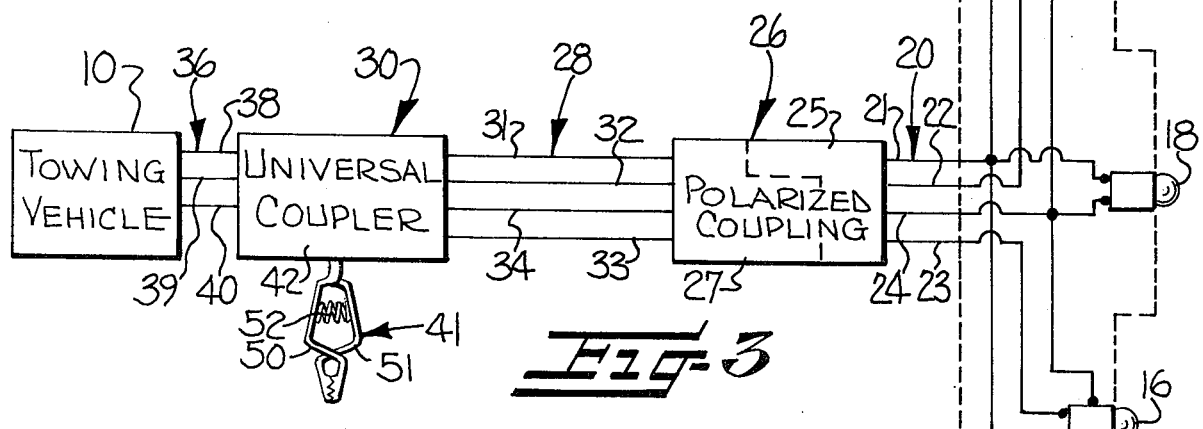
FIG. 3 is a schematic view illustrating the manner in which the coupling apparatus of the present invention interconnects the multi-conductor electrical circuits of a towing vehicle and trailer.
Figure 4:
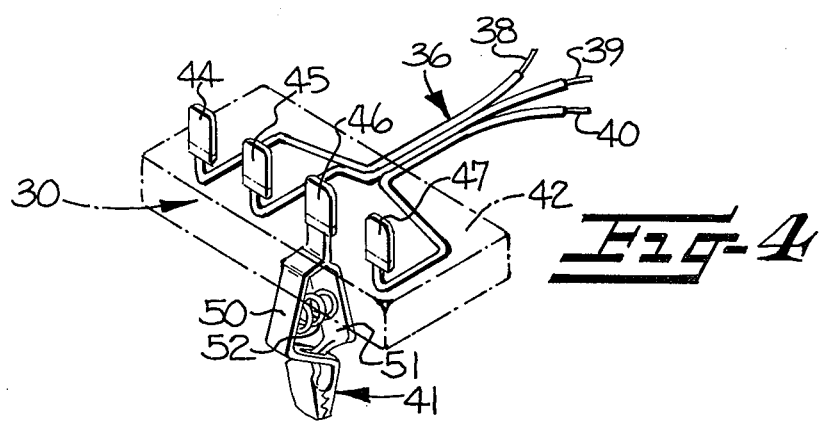
FIG. 4 is a perspective view of a portion of the universal coupling means of the present invention, with the solid support being shown in dashed lines.

As will be apparent from FIG. 3, the three wires 38, 39, 40 of the second vehicle circuit 36 are adapted to be permanently interconnected to the electrical circuit of the towing vehicle 10. Most automobiles and towing vehicles utilize the metal frame of the vehicle as an electrical ground, and thus there is no need for a fourth ground wire since the clamp 41 serves to ground the circuit when it is affixed to any portion of the metal frame of the automobile. Thus the clamp 41 serves the dual function of mounting and anchoring the support 42 to the automobile, while also grounding the electrical circuit of the trailer.

In operation, the wires of the first vehicle system 20 are permanently connected to the electrical circuit 14 of the trailer 12, and the three wires of the second vehicle system 36 are permanently connected to the circuit of the towing vehicle 10. The support 42 is then mounted in the trunk or other convenient location of the towing vehicle by affixing the clamp 41 to a portion of the metal frame of the vehicle. The terminals 54-57 are then interconnected to the contacts 44-47 in a manner which is thought to provide a proper, matched connection of the two circuits, and the polarized coupling 26 is also interconnected. Where the electrical circuit of the trailer does not operate properly upon the testing thereof, the terminals 54-57 are rearranged until the proper operation is achieved. If desired, the support 42 may then be physically marked by a color coded system or the like to indicate the proper orientation of the terminals for this particular trailer, thereby facilitating any subsequent recoupling of this trailer with the towing vehicle. The polarized coupling 26 serves to permit the rapid separation and recoupling of the vehicles and electrical circuits once the proper relative orientation of the conductors is determined in the manner described above.

While in the illustrated embodiment the universal coupling means 30 is shown operatively attached to the towing vehicle 10, it will be appreciated that the coupling means 30 could be attached to the trailer 10 and the first system 20 connected to the towing vehicle 10 where the frame of the trailer serves as the ground conductor of its electrical circuit.

In the drawings and specification, there has been set forth a preferred embodiment of the invention, and although specific terms are employed, they are used in a generic and descriptive sense only and not for purposes of limitation.

That which is claimed is:

1. An electrical coupling apparatus for interconnecting respective first and second multi-conductor electrical circuits of releasably interconnected vehicles, such as an automobile and trailer, and having provision for assuring a desired connection between the several conductors in said first and second circuits, said apparatus comrising polarized coupling means for releasably interconnecting said first and second circuits with a fixed predetermined arrangement of the several conductors thereof, and universal coupling means interposed between said polarized coupling means and one of said first and second circuits for selectively and releasably interconnecting the conductors of said one circuit and the conductors of an intermediate multi-conductor electrical circuit, said universal coupling means comrising a. an electrically insulating support, b. a plurality of spaced apart, electrical contacts carried by said support, with each conductor of one of said one circuit or said intermediate circuit being electrically connected to separate ones of said contacts, c. a plurality of individual terminals, with each conductor of the other of said one circuit or said intermediate circuit being electrically connected to separate ones of said terminals, d. means for releasably interconnecting each of said terminals with any one of said contacts, whereby said terminals may be selectively interconnected to said contacts in any desired arrangement; and e. electrically conductive clamping means for releasably attaching said support to the frame of one of said vehicles, said clamping means being electrically connected with one of said contacts for thereby providing a common ground for the two vehicles.

2. The electrical coupling apparatus as defined in claim 1 wherein each of said first, second and intermediate circuits comprises at least three separate wires.

3. The electrical coupling apparatus as defined in claim 2 wherein said contacts each comprise a metallic flat prong fixedly carried by said support, and said terminals each comprise a metallic lug, and said means for releasably interconnecting said terminals and contacts comprises a curled side edge extending along each side of one of said prongs and lugs, and such that each contact is adapted to be slidably connected to each terminal with the curled side edges resiliently engaging the adjacent surface to effect a secure electrical interconnection.

4. The electrical coupling apparatus as defined in claim 3 wherein said support comprises a solid rectangular plastic block.

5. An electrical coupling apparatus for interconnecting respective first and second multi-conductor electrical circuits of releasably interconnected vehicles, such as an automobile and trailer, and having provision for assuring a desired connection between the several conductors in said first and second circuits, said apparatus comrising polarized coupling means for releasably interconnecting three separate wires and a vehicle ground of said first electrical circuit with three separate wires and a vehicle ground of said second circuit with a fixed predetermined arrangement of the several wires, and universal coupling means interposed between said polaized coupling means and one of said first and second circuits for selectively and releasably interconnecting the wires of said one circuit with an intermediate four wire circuit, said universal coupling means comprising a. an electrically insulating support,
b. four spaced apart, like, electrical contacts carried by said support, with each of said three wires and vehicle ground of said one circuit being electrically connected to separate ones of said contacts,
c. four individual terminals, with each of said three wires and vehicle ground of the other of said first or second circuits being electrically connected to separate ones of said terminals,
d. means for releasably interconnecting each of said terminals with any one of said contacts, whereby said terminals may be selectively interconnected to said contacts in any desired arrangement; and
e. electrically conductive clamping means for releasably attaching said support to the frame of one of said vehicles, said clamping means being electrically connected with one of said contacts for thereby providing a common ground for the two vehicles.

* * * * *

UNITED STATES PATENT AND TRADEMARK OFFICE
CERTIFICATE OF CORRECTION

PATENT NO. : 4,057,310
DATED : November 8, 1977
INVENTOR(S) : Clyde J. Young

It is certified that error appears in the above-identified patent and that said Letters Patent are hereby corrected as shown below:

Column 4, Line 64 following "of" and preceding "one of said" insert - each -.

Signed and Sealed this

Fourth Day of April 1978

[SEAL]

Attest:

RUTH C. MASON
Attesting Officer

LUTRELLE F. PARKER
Acting Commissioner of Patents and Trademarks